United States Patent
Masubuchi

[19]

[11] Patent Number: 5,809,967
[45] Date of Patent: Sep. 22, 1998

[54] IGNITION TIMING CONTROL DEVICE FOR SPARK-IGNITION TYPE ENGINE

[75] Inventor: Masahiko Masubuchi, Mishima, Japan

[73] Assignee: Toyota Jidosha Kabushiki Kaisha, Toyota, Japan

[21] Appl. No.: 895,635

[22] Filed: Jul. 17, 1997

[30] Foreign Application Priority Data

Aug. 13, 1996 [JP] Japan .................................. 8-213761

[51] Int. Cl.$^6$ ........................................................ F02P 5/00
[52] U.S. Cl. ........................................................ 123/417
[58] Field of Search .................................. 123/417, 406, 123/415, 416, 478, 571; 364/431.04

[56] References Cited

U.S. PATENT DOCUMENTS

| | | | |
|---|---|---|---|
| 5,448,975 | 9/1995 | Sato ........................................ | 123/417 |
| 5,505,174 | 4/1996 | Komoriya et al. ..................... | 123/417 |
| 5,505,175 | 4/1996 | Mai et al. ............................... | 123/417 |

FOREIGN PATENT DOCUMENTS 6-80825 U  11/1994  Japan ..................... 123/417

*Primary Examiner*—Raymond A. Nelli
*Attorney, Agent, or Firm*—Oliff & Berridge, PLC

[57] ABSTRACT

An ignition timing control device for a spark-ignition type engine comprises an oxygen concentration sensor and an air-fuel ratio sensor arranged in the exhaust passage of the engine. The fuel amount to be fed to the engine is controlled on the basis of the output signal of the oxygen concentration sensor to make the air-fuel ratio equal to the stoichiometric air-fuel ratio, which depends on the composition of the fuel burned in the engine. The air-fuel ratio sensor detects the actual air-fuel ratio, i.e., the stoichiometric air-fuel ratio of the burned fuel. The relationships between the stoichiometric air-fuel ratio of the burned fuel and the suitable ignition timing is obtained in advance and the ignition timing is corrected in accordance with the detected stoichiometric air-fuel ratio.

9 Claims, 7 Drawing Sheets

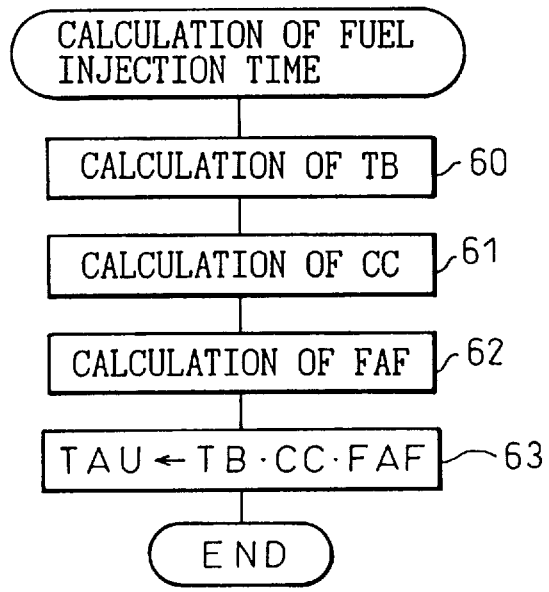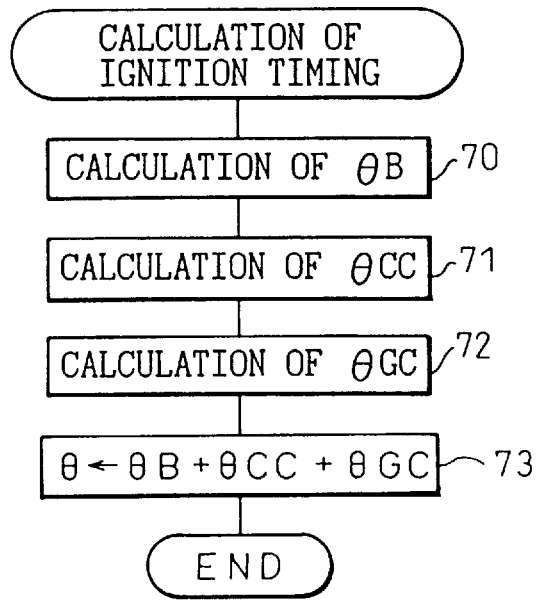

5,809,967

IGNITION TIMING CONTROL DEVICE FOR SPARK-IGNITION TYPE ENGINE

BACKGROUND OF THE INVENTION

1. Field of the Invention

The present invention relates to an ignition timing control device for a spark-ignition type engine.

2. Description of the Related Art

A fuel gas engine, in which a fuel gas is burned, is generally provided with a spark plug, and the air-fuel mixture formed in a combustion chamber of the engine is ignited by the spark plug and burned. Such an engine is disclosed in Japanese Unexamined Utility Model Publication No. 6-80825.

It is known that the composition of the fuel gas varies in accordance with the production place, season, and year thereof. However, a suitable ignition timing depends on the composition of the fuel gas. Thus, it is not possible to make the ignition timing suitable when the composition of the fuel gas varies. As a result, the actual output torque of the engine may deviate from the target output torque, and the drivability may deteriorate.

SUMMARY OF THE INVENTION

An object of the present invention is to provide an ignition timing control device for a spark-ignition type engine able to make the ignition timing suitable regardless the composition of the fuel.

According to the present invention, there is provided an ignition timing control device for a spark-ignition type engine having an exhaust passage, a combustion chamber, and a spark plug arranged in the combustion chamber, the device comprising: an oxygen concentration sensor arranged in the exhaust passage for detecting the oxygen concentration in the exhaust gas; an air-fuel ratio control means for controlling the fuel amount to be fed to the engine on the basis of the output signal of the oxygen concentration sensor to make the air-fuel ratio equal to the stoichiometric air-fuel ratio which is determined in accordance with the composition of the fuel; an air-fuel ratio sensor arranged in the exhaust passage for detecting the air-fuel ratio to detect the actual stoichiometric air-fuel ratio; and ignition timing control means for controlling the ignition timing in accordance with the actual stoichiometric air-fuel ratio.

The present invention may be more fully understood from the description of the preferred embodiments of the invention as set forth below, together with the accompanying drawings.

BRIEF DESCRIPTION OF THE DRAWINGS

In the drawings:

FIG. 7 shows a flowchart for calculating the fuel injection time TAU;

FIG. 8 shows a flowchart for calculating the ignition timing θ;

DESCRIPTION OF THE PREFERRED EMBODIMENTS

Figure 1:
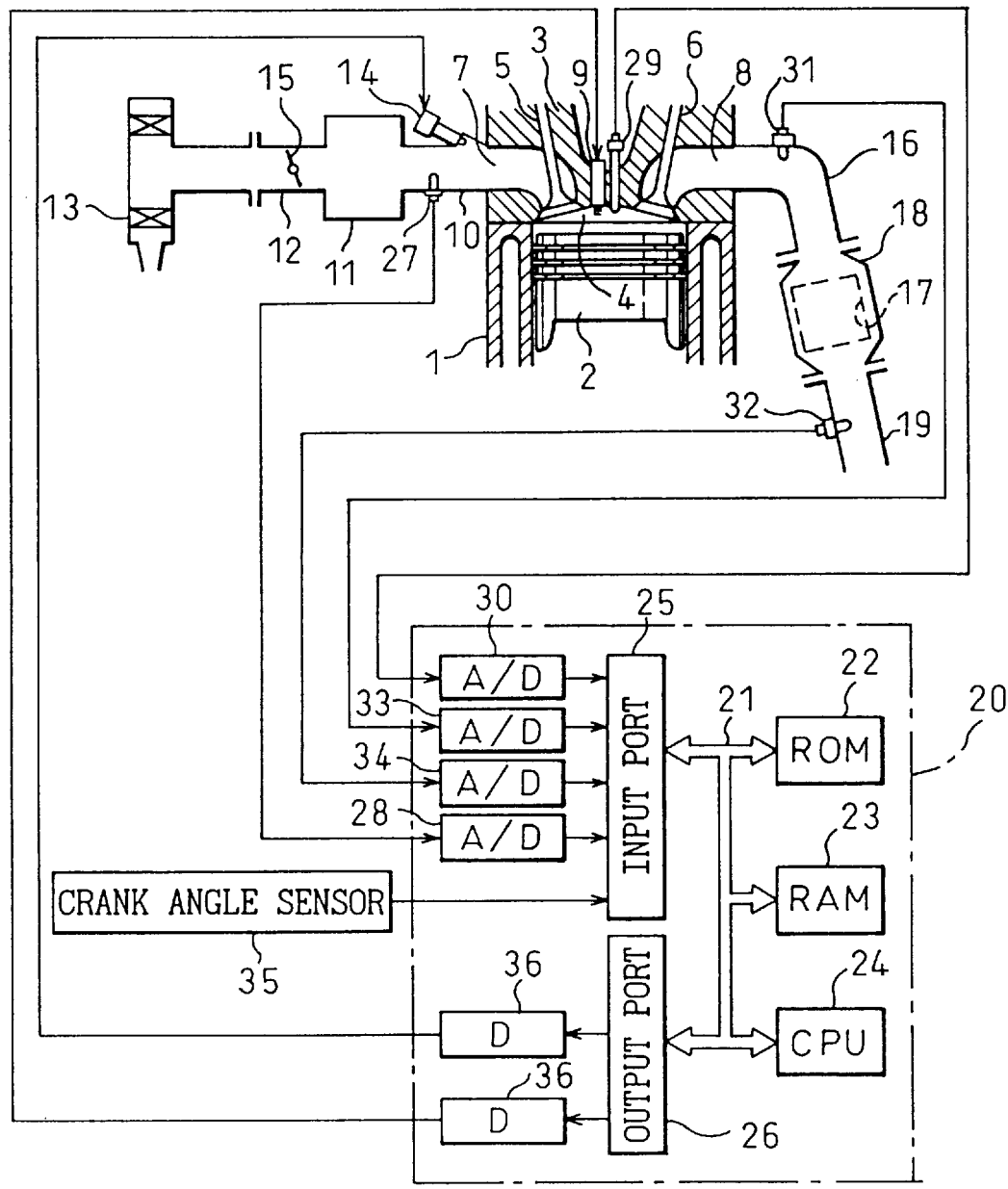
FIG. 1 is a general view of a spark-ignition type engine.

Referring to FIG. 1, a reference numeral 1 designates a cylinder block, 2 designates a piston, 3 designates a cylinder head, 4 designates a combustion chamber, 5 designates an intake valve, and 6 designates an exhaust valve, 7 designates an intake port, 8 designates an exhaust port, and 9 designates a spark plug arranged in the combustion chamber 4. Each intake port 7 is connected to a common surge tank 11 via a corresponding intake branch 10, and the surge tank 11 is connected to an air cleaner 13 via an intake duct 12. In each branch 10, a fuel injector 14 is arranged to inject compressed natural gas (CNG) as fuel into the corresponding branch 10. Further, a throttle valve 15 is arranged in the intake duct 12. On the other hand, each exhaust port 8 is connected to a catalytic converter 18 housing a three-way catalyst 17 therein, via a common exhaust manifold 16, and the converter 18 is connected to an exhaust pipe 19.

The electronic control unit (ECU) 20 is constructed as a digital computer and comprises a read-only memory (ROM) 22, a random-access memory (RAM) 23, a CPU (micro processor) 24, an input port 25, and an output port 26. ROM 22, RAM 23, CPU 24, the input port 25, and the output port 26 are interconnected with each other via a bidirectional bus 21. In each intake branch 10, a pressure sensor 27 generating an output voltage in proportion to the pressure in the branch 10, is arranged, and this output voltage is input to the input port 22 via an AD converter 28. According to the output voltage of the pressure sensor 27, the CPU 24 calculates the intake air amount. In the combustion chamber 4, a pressure sensor 29 generating an output voltage in proportion to the pressure in the combustion chamber 4, is arranged, and this output voltage is input to the input port 22 via an AD converter 30.

Figure 2:
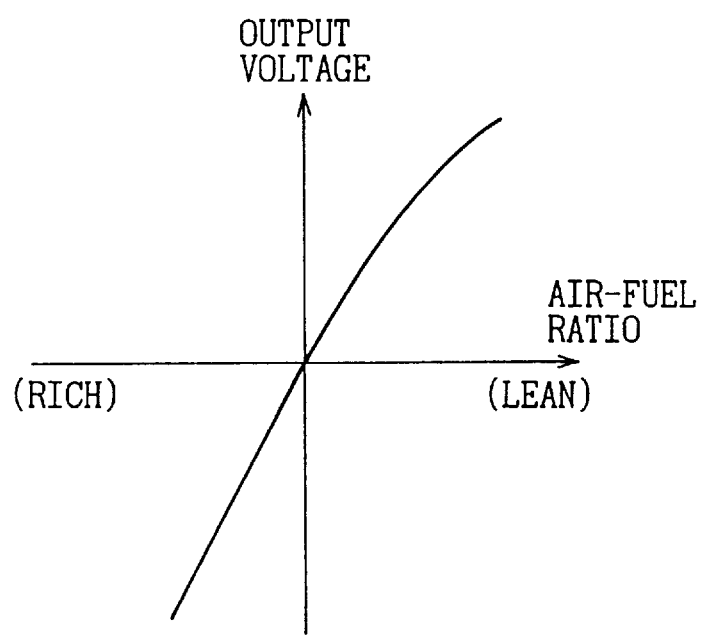
FIG. 2 is a diagram illustrating the output of an air-fuel ratio sensor.

Further, an oxygen concentration sensor ($O_2$ sensor) 31 is arranged in the correcting portion of the exhaust manifold 16, the output voltage of the $O_2$ sensor 31 varying in accordance with concentration of oxygen in the exhaust gas, and an air-fuel ratio sensor 32 detecting the air-fuel ratio is arranged in the exhaust pipe 19. The output voltages of the sensors 31 and 32 are input to the input port 22 via corresponding AD converters 33 and 34. The $O_2$ sensor 31 comprises an element of zirconia or titania, and generates the output voltage of about 0.9 Volts when the air-fuel ratio is on the rich side with respect to the stoichiometric air-fuel ratio (A/F)S, and generates the output voltage of about 0.1 Volts when the air-fuel ratio is on the lean side with respect to the stoichiometric air-fuel ratio (A/F)S. The air-fuel ratio sensor 32 generates an output voltage corresponding to the air-fuel ratio, as shown in FIG. 2, and thus, the actual air-fuel ratio can be detected.

The input port 25 is also connected to a crank angle sensor 35, which generates a pulse whenever a crankshaft is turned by, for example, 30 degrees. According to these pulses, the CPU 24 calculates the engine speed. The output port 26 is connected to the spark plugs 9 and fuel injectors 14, via corresponding drive circuits 36.

In the engine shown in FIG. 1, the fuel injection time TAU is calculated on the basis of the following equation:

$$TAU = TB \cdot CC \cdot FAF$$

where TB, CC, and FAF represent a basic fuel injection time, a correction coefficient, and a feedback correction coefficient, respectively.

The basic fuel injection time TB is a fuel injection time, obtained by experiment, required for making the air-fuel ratio equal to the stoichiometric air-fuel ratio when the composition of CNG is a reference composition, described hereinafter, and is stored in the ROM 22 in advance in the form of a map shown in FIG. 9, as a function of the engine operating condition, such as the engine load Q/N (the intake air amount Q/the engine speed N), and the engine speed N.

The correction coefficient CC expresses both the coefficient of increase during warm-up and the coefficient of increase during acceleration. When there is no need for a correction, the coefficient CC is made 1.

The feedback correction coefficient FAF is for making the air-fuel ratio equal to the stoichiometric air-fuel ratio (A/F)S on the basis of the output signal of the $O_2$ sensor 31. Next, a control of the feedback correction coefficient FAF based on the output signals of the $O_2$ sensor 31 will be explained with reference to FIGS. 3 and 4.

Figure 3:
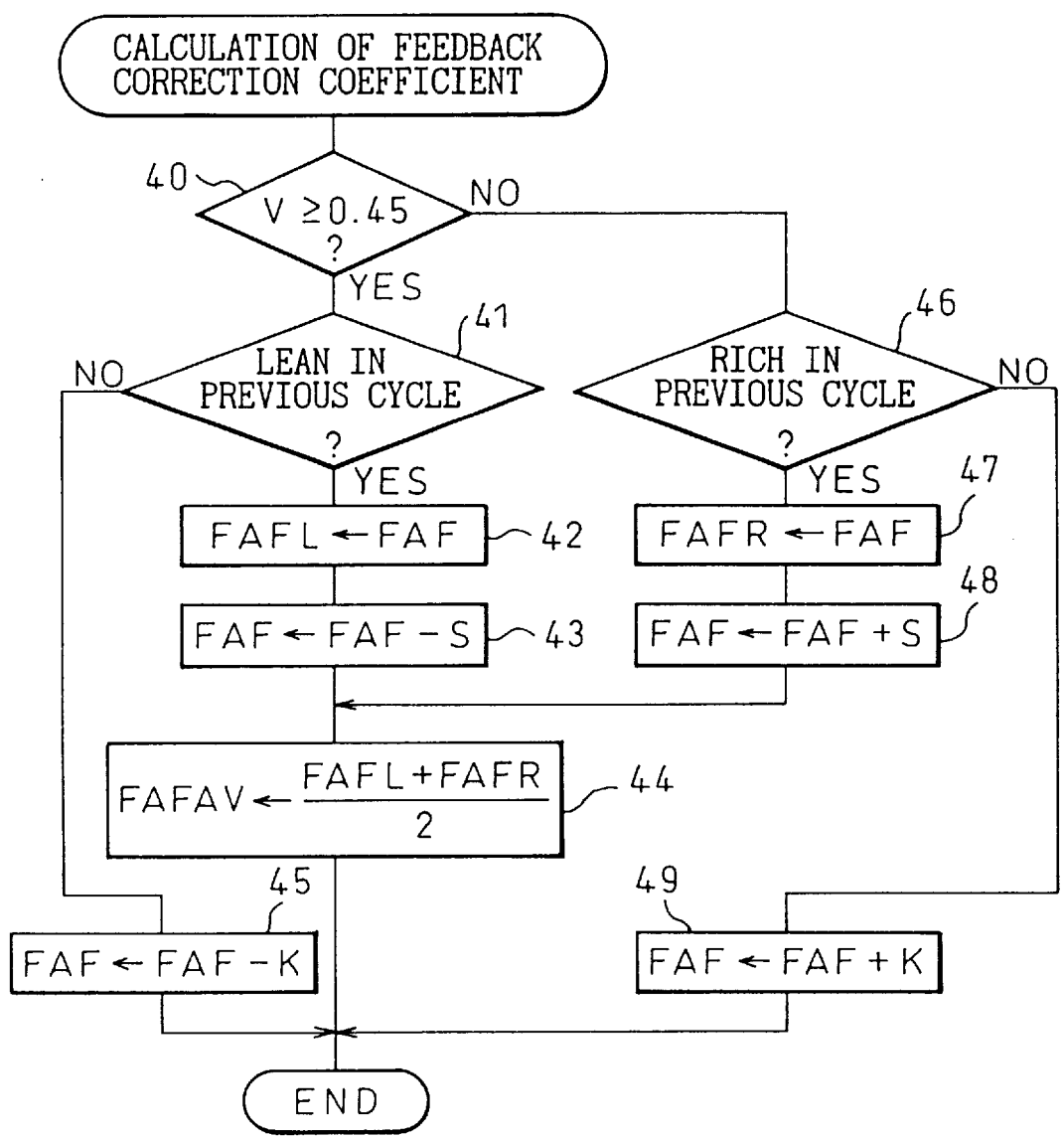
FIG. 3 shows a flowchart for calculating a feedback correction coefficient FAF.

FIG. 3 shows a routine for calculating the feedback correction coefficient FAF. This routine is executed in, for example, a main routine of the engine.

Figure 4:
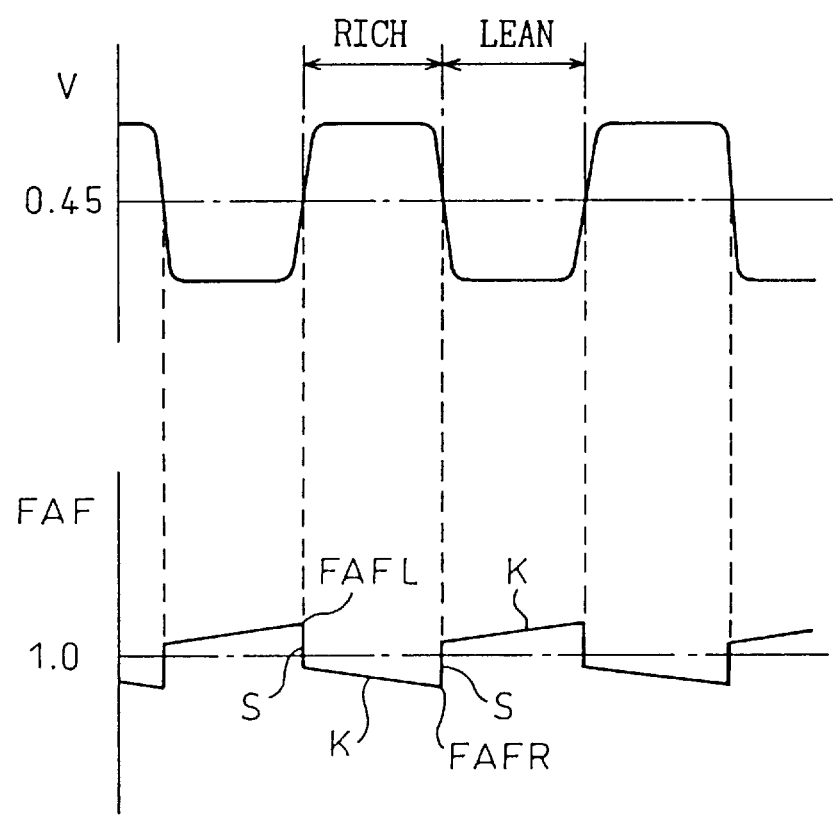
FIG. 4 is a diagram illustrating a change in the feedback correction coefficient FAF.

Referring to FIG. 3, first, in step 40, it is judged whether the output voltage V of the $O_2$ sensor 31 is higher than 0.45V, which is a reference voltage, namely, whether the air-fuel ratio is on the rich side of the stoichiometric air-fuel ratio. If V≧0.45V, namely, if the air-fuel ratio is on the rich side, the routine goes to step 41, where it is judged whether the air-fuel ratio was on the lean side in the previous processing cycle. If it is judged that the air-fuel ratio was on the lean side in the previous processing cycle, namely, if it is judged that the air-fuel ratio has changed from the lean side to the rich side, the routine goes to step 42, where the feedback correction coefficient FAF is memorized as FAFL. In the following step 43, the skip value S is subtracted from the feedback correction coefficient FAF, and thereby the feedback correction coefficient FAF is drastically decreased, as shown in FIG. 4. In following step 44, the average of FAFL and FAFR is memorized as FAFAV. Conversely, if it is judged, in step 41, that the air-fuel ratio was on the rich side in the previous processing cycle, the routine goes to step 45, where the integral value K (K<<S) is subtracted from the feedback correction coefficient FAF. In this case, the feedback correction coefficient FAF is gradually decreased, as shown in FIG. 4.

If it is judged in step 40 that V<0.45V, namely, if it is judged that the air-fuel ratio is on the lean side, the routine goes to step 46, where it is judged whether the air-fuel ratio was on the rich side in the previous processing cycle. If it is judged that the air-fuel ratio was on the rich side in the previous processing cycle, namely if it is judged that the air-fuel ratio has changed from the rich side to the lean side, the routine goes to step 47, where the feedback correction coefficient FAF is memorized as FAFR. In following step 48, the skip value S is added to the feedback correction coefficient FAF, and thereby the feedback correction coefficient FAF is drastically increased, as shown in FIG. 4. In the following step 44, the average of FAFL and FAFR is memorized as FAFAV. Conversely, if it is judged, in step 46, that the air-fuel ratio was on the lean side in the previous processing cycle, the routine goes to step 49, where the integral value K is added to the feedback correction coefficient FAF. In this case, the feedback correction coefficient FAF is gradually increased, as shown in FIG. 4.

When the air-fuel ratio becomes rich and thereby the feedback correction coefficient FAF increases, the fuel injection time TAU is made shorter. When the air-fuel ratio becomes lean and thereby the feedback correction coefficient FAF decreases, the fuel injection time TAU is made longer. As a result, the air-fuel ratio is maintained to the stoichiometric air-fuel ratio (A/F)S. In this connection, the feedback correction coefficient FAF alternately increases and decreases relative to 1.0, as shown in FIG. 4.

On the other hand, the stoichiometric air-fuel ratio (A/F)S of CNG is determined in accordance with the composition thereof, and will vary when the composition of CNG varies. For example, the stoichiometric air-fuel ratio is about 16.7 when the composition is a reference composition, described hereinafter, and is about 17.1 when the fuel gas consists of methane of 100%. However, in the present embodiment, the air-fuel ratio is controlled in accordance with the output signal of the $O_2$ sensor 31, of which the output signal varies in accordance with the oxygen concentration in the exhaust gas, and thus, the air-fuel ratio is kept at the stoichiometric air-fuel ratio, regardless of the composition of CNG.

As long as the above-mentioned control of the air-fuel ratio is performed and thereby the actual air-fuel ratio is made equal to the stoichiometric air-fuel ratio, the air-fuel ratio sensor 32 detects the stoichiometric air-fuel ratio of the used CNG.

Note that, while any composition may be used as a reference composition, the reference composition in the present embodiment is the composition of the Japanese city gas 13A, an example of which is as follows:

Methane: 87.5%

Ethane: 7.6%

Propane: 2.3%

Butane: 2.6%

On the other hand, the ignition timing in the engine shown in FIG. 1 is calculated on the basis of the following equation:

$$\theta = \theta B + \theta CC + \theta GC$$

where θB, θCC, and θGC represent a basic ignition timing, a correction advance, and a composition correction advance, respectively.

Figure 10:
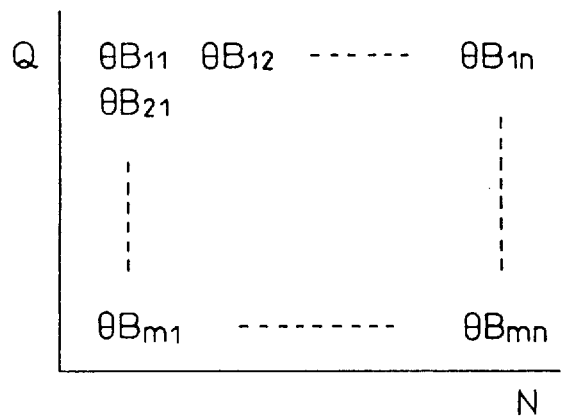
FIG. 10 is a diagram illustrating a basic ignition timing θB.

The basic ignition timing θB is an ignition timing, obtained by experiment, required to make the ignition timing equal to MBT (minimum advance for best Torque) when the composition of CNG is the reference composition, and is stored in the ROM 22 in advance in the form of a map shown in FIG. 10, as a function of the engine operating condition, such as the intake air amount Q and the engine speed N.

The correction advance θCC expresses both the correction advance during the high temperature and the correction retardance during warm-up. The correction advance θCC is made the positive value when the ignition timing is to be advanced, and is made the negative value when the ignition timing is to be retarded, and is made zero when there is no need for the correction.

The composition correction advance θGC is determined on the basis of the composition of the CNG, and is made zero when there is no need for the correction, i.e., when the actual composition of the CNG is the reference composition.

As mentioned at the beginning, the composition of the CNG depends on the production place, season and year. However, an ignition timing suitable for maximizing the output torque of the engine depends on the stoichiometric air-fuel ratio (A/F)S, which depends on the composition of the CNG. Therefore, in the engine shown in FIG. 1, first, the air-fuel ratio is made equal to the stoichiometric air-fuel ratio, and the stoichiometric air-fuel ratio (A/F)S of CNG is detected, and then the ignition timing is corrected on the basis of the composition correction advance θGC, which depends on the detected stoichiometric air-fuel ratio (A/F)S.

Figure 5:
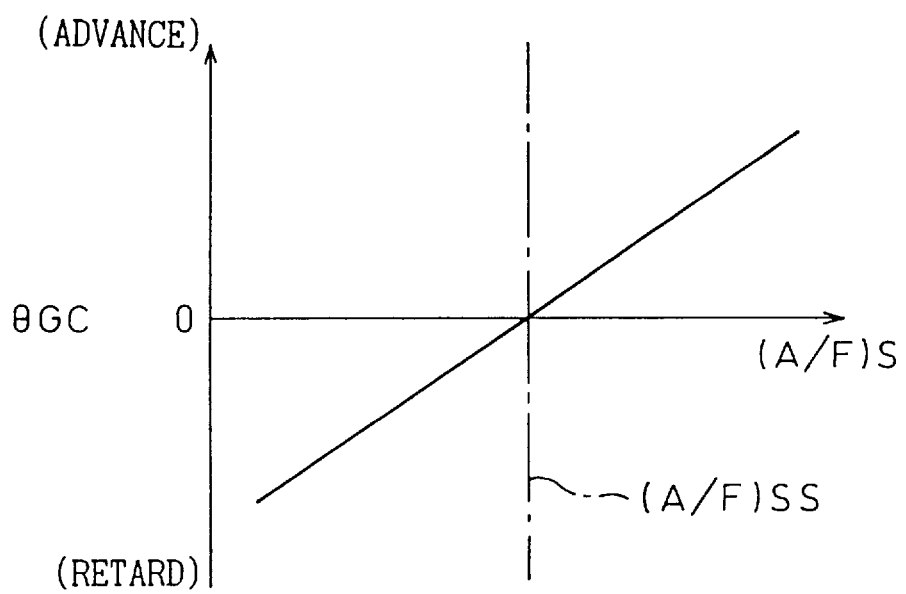
FIG. 5 is a diagram illustrating a composition correction advance θGC.
Figure 6:
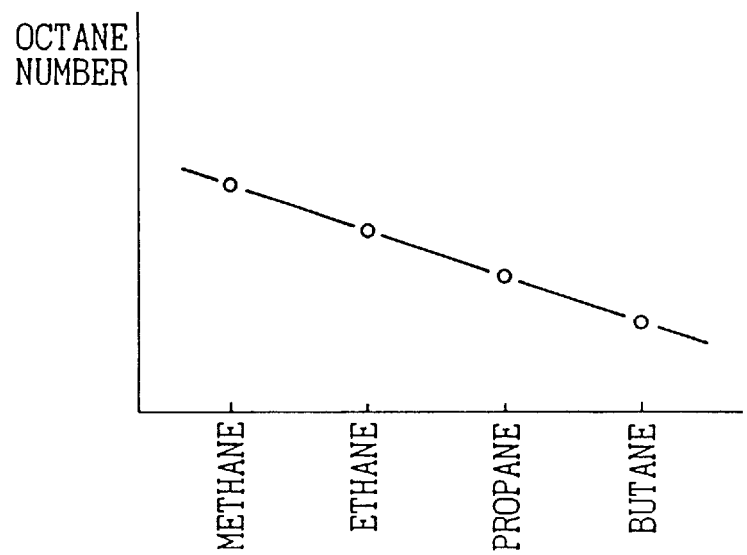
FIG. 6 is a diagram illustrating an octane number of each composition of CNG.

FIG. 5 shows the composition correction advance θGC, obtained by experiment, required for making the ignition timing θ equal to the suitable ignition timing with the various stoichiometric air-fuel ratio (A/F)S. In FIG. 5, (A/F)SS represents the stoichiometric air-fuel ratio of the reference gas, and is 16.7 in the present embodiment. As shown in FIG. 5, the composition correction advance θGC becomes larger as the stoichiometric air-fuel ratio (A/F)S becomes larger. Namely, when (A/F)S>(A/F)SS, the correction advance becomes larger as the stoichiometric air-fuel ratio (A/F)S becomes larger, and when (A/F)S<(A/F)SS, the correction retardance becomes larger as the stoichiometric air-fuel ratio (A/F)S becomes smaller.

The ratio of the hydrocarbon having the larger carbon number in CNG, such as ethane, or propane, to methane becomes higher as the stoichiometric air-fuel ratio (A/F)S becomes smaller. On the other hand, the octane number of the hydrocarbon becomes smaller as the carbon number thereof becomes higher. Thus, it is possible to maximize the output torque of the engine regardless the composition of CNG, by correcting the ignition timing θ using the composition correction advance θGC, which becomes smaller as the stoichiometric air-fuel ratio (A/F)S becomes smaller.

Note that, in the gasoline engine, a knock sensor is provided for detecting the engine knock, and the ignition timing is controlled to be advanced gradually until the engine knock occurs, and to be retarded gradually until the engine knock does not occur, to thereby ensure the larger output torque of the engine. However, in the fuel gas engine as shown in FIG. 1, the octane number of the fuel gas is kept relatively high, even with a variance in the composition of the fuel gas, and thus, engine knock seldom occurs. Therefore, it is not possible to control the ignition timing in accordance with the occurrence of the engine knock in the fuel gas engine. In the present embodiment, the ignition timing is controlled on the basis of the relationships between the stoichiometric air-fuel ratio of CNG and the suitable ignition timing, obtained in advance, and thus, it is possible to make the ignition timing suitable in the fuel gas engine in which engine knock hardly occurs.

FIG. 7 shows a routine for executing the control of the fuel injection time, mentioned above. This routine is executed by interruption every predetermined crank angle.

Figure 9:
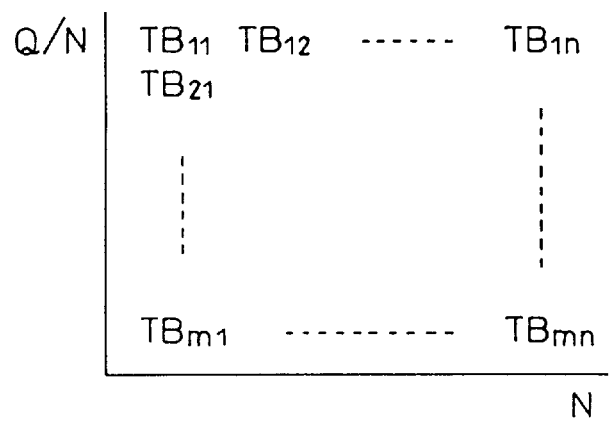
FIG. 9 is a diagram illustrating a basic fuel injection time TB.

Referring to FIG. 7, first, in step 60, the basic fuel injection time TB is calculated in accordance with the present engine operating condition, using the map shown in FIG. 9. In the following step 61, the correction coefficient CC is calculated in accordance with the present engine operating condition. In the following step 62, the feedback correction coefficient FAF is calculated in the routine shown in FIG. 3. In the following step 63, the fuel injection time TAU is calculated using the following equation:

$$TAU = TB \cdot CC \cdot FAF$$

In each fuel injector 14, fuel is injected for TAU.

FIG. 8 shows a routine for executing the control of the ignition timing, mentioned above. This routine is executed by interruption every predetermined crank angle.

Referring to FIG. 8, first, in step 70, the basic fuel injection time θB is calculated in accordance with the present engine operating condition, using the map shown in FIG. 10. In the following step 71, the correction advance θCC is calculated. In the following step 72, the composition correction advance θGC is calculated in accordance with the stoichiometric air-fuel ratio detected by the air-fuel ratio sensor 32, using the map shown in FIG. 5. In the following step 73, the ignition timing θ is calculated using the following equation:

$$\theta = \theta B + \theta CC + \theta GC$$

Note that, fuel burned in the engine shown in FIG. 1 may be any fuel, and especially, a fuel gas which is a primary fuel gases comprising natural gases such as CNG and petroleum gases such as liquefied petroleum gas (LPG) or a secondary fuel gases comprising coal converted gas or petroleum converted gas, and liquid fuels such as methanol.

According to the present invention, it is possible to provide an ignition timing control device for a spark-ignition type engine able to make the ignition timing equal to the suitable ignition timing, regardless of the composition of the fuel.

While the invention has been described by reference to specific embodiments chosen for the purposes of illustration, it should be apparent that numerous modifications could be made thereto by those skilled in the art without departing from the basic concept and scope of the invention.

I claim:

1. An ignition timing control device for a spark-ignition type engine having an exhaust passage, a combustion chamber, and a spark plug arranged in the combustion chamber, the device comprising:

an oxygen concentration sensor arranged in the exhaust passage for detecting the oxygen concentration in the exhaust gas;

an air-fuel ratio control means for controlling the fuel amount to be fed to the engine on the basis of the output signal of the oxygen concentration sensor to make the air-fuel ratio equal to the stoichiometric air-fuel ratio which is determined in accordance with the composition of the fuel;

an air-fuel ratio sensor arranged in the exhaust passage for detecting the air-fuel ratio to detect the actual stoichiometric air-fuel ratio; and ignition timing control means for controlling the ignition timing in accordance with the actual stoichiometric air-fuel ratio.

2. A device according to claim 1, wherein the fuel burned in the engine is a fuel gas.

3. A device according to claim 2, wherein the fuel gas is one of the primary fuel gases comprising natural gases including compressed natural gas (CNG) and petroleum gases including liquefied petroleum gas (LPG), and secondary fuel gases comprising coal converted gas and petroleum converted gas.

4. A device according to claim 1, wherein the fuel burned in the engine is liquid fuel comprising methanol.

5. A device according to claim 1, wherein the ignition timing control means controls the ignition timing on the basis of a basic ignition timing suitable when the composition of the fuel conforms to a predetermined reference composition having a reference stoichiometric air-fuel ratio, and a difference between the actual stoichiometric air-fuel ratio and the reference stoichiometric air-fuel ratio.

6. A device according to claim 5, wherein the reference stoichiometric air-fuel ratio is about 16.7.

7. A device according to claim 5, wherein the ignition timing control means makes the advance of the ignition timing larger as the actual stoichiometric air-fuel ratio becomes larger.

8. A device according to claim 1, wherein the ignition timing control means comprises a memory in which a relationship between the actual stoichiometric air-fuel ratio and a suitable ignition timing is stored, and makes the ignition timing equal to the suitable ignition timing.

9. A device according to claim 1, wherein the air-fuel ratio control means controls the fuel amount to be fed to the engine on the basis of a feedback correction coefficient, which is set on the basis of the output signal of the oxygen concentration sensor.

* * * * *